US009639377B2

(12) United States Patent
Goodes et al.

(10) Patent No.: US 9,639,377 B2
(45) Date of Patent: May 2, 2017

(54) METHOD FOR LINKING AND LOADING TO PROTECT APPLICATIONS

(75) Inventors: Grant Stewart Goodes, Manotick (CA); Clifford Liem, Ottawa (CA)

(73) Assignee: IRDETO B.V., Hoofddorp (NL)

(*) Notice: Subject to any disclaimer, the term of this patent is extended or adjusted under 35 U.S.C. 154(b) by 796 days.

(21) Appl. No.: 13/634,724

(22) PCT Filed: Mar. 31, 2010

(86) PCT No.: PCT/CA2010/000450
§ 371 (c)(1),
(2), (4) Date: Sep. 13, 2012

(87) PCT Pub. No.: WO2011/120122
PCT Pub. Date: Oct. 6, 2011

(65) Prior Publication Data
US 2013/0014275 A1    Jan. 10, 2013

(51) Int. Cl.
*G06F 21/00* (2013.01)
*G06F 9/445* (2006.01)
(Continued)

(52) U.S. Cl.
CPC .......... *G06F 9/44521* (2013.01); *G06F 21/14* (2013.01); *G06F 21/51* (2013.01); *G06F 8/54* (2013.01)

(58) Field of Classification Search
CPC ...... G06F 21/10; G06F 21/14; G06F 9/44521; G06F 21/51; G06F 8/54; H04L 9/002; H04L 63/0428; G11B 20/00086
See application file for complete search history.

(56) References Cited

U.S. PATENT DOCUMENTS 6,801,999 B1 * 10/2004 Venkatesan et al. .......... 713/167
7,287,166 B1 * 10/2007 Chang et al. .................. 713/187
(Continued)

FOREIGN PATENT DOCUMENTS

WO    2006001365 A1    7/2013

OTHER PUBLICATIONS

Collberg et al., "A Taxonomy of Obfuscating Transformations", Technical Report #148, Department of Computer Science, University of Auckland, Private Bag 92019, Auckland, New Zealand, 1997 http://www.cs.arizona.edu/~collberg/Research/Publication/CollbergThomborsonLow97a/A4.pdf *Part 6 "Control transformations"; Part 7 "Data Transformations".
(Continued)

*Primary Examiner* — Carl Colin
*Assistant Examiner* — Ghodrat Jamshidi
(74) *Attorney, Agent, or Firm* — Marc S. Kaufman; Rimon, PC

(57) ABSTRACT

A linker or loader, and associated method, is described, whereby the application of security transformations to object-code modules can be deferred until link or load-time, through, for example, memory relocation, selection from diverse instances of a module, and late-binding of constants. This provides several benefits over conventional source-to-source security transformations. These deferred security transformations can be applied in a very light-weight manner and create many opportunities for diversity in the resulting executable program, enhancing security, while at the same time minimizing the impact on execution performance and correctness, and reducing the complexity of debugging.

26 Claims, 6 Drawing Sheets

(51) Int. Cl.
*G06F 21/14* (2013.01)
*G06F 21/51* (2013.01)

(56) References Cited

U.S. PATENT DOCUMENTS

| | | | |
|---|---|---|---|
| 7,565,665 B2 | 7/2009 | Forin et al. | |
| 2004/0260933 A1 | 12/2004 | Lee | |
| 2005/0028143 A1* | 2/2005 | Aridor et al. | 717/122 |
| 2006/0179421 A1* | 8/2006 | Bielski et al. | 717/115 |
| 2006/0265407 A1* | 11/2006 | Claussen et al. | 707/100 |
| 2007/0245323 A1* | 10/2007 | Bertelrud | 717/140 |
| 2008/0016314 A1 | 1/2008 | Li et al. | |
| 2008/0181396 A1* | 7/2008 | Balakrishnan et al. | 380/28 |
| 2013/0124849 A1* | 5/2013 | Steele et al. | 713/150 |

OTHER PUBLICATIONS

Nakka et al., "An Architectural Framework for Providing Reliability and Security Support", Proceedings of the 2004 International Conference on Dependable Systems and Networks (DSN'04), 2004, IEEE, pp. 585-594 *Part 4.1 Memory Layout Randomization Module.

Kil et al., "Address Space Layout Permutation (ALSP): Towards Fine-Grained Randomization of Commodity Software", Proceedings of the 22nd Annual Computer Security Applications Conference (ACSAC'06) 2006, IEEE, pp. 339-348 *Part 1 "Introduction"; Part 3 "Address Space Layout Permutation", Part 3.1 "User Level Address Permutation", 3.3.

European Search Report of corresponding European Application No. 10848641.6 dated Mar. 12, 2014.

Bhatkar S et al: "Efficient techniques for comprehensive protection from memory error exploits", Proceedings of the 14th Usenix Security Symposium, Baltimore, MD USA, Usenix Assoc, Berkeley, CA, USA Jul. 31, 2005 (Jul. 31, 2005), pp. 255-270, XP007910303, ISBN: 978-1-931971-34-8.

Christopher W. Fraser et al: "A machine-independent linker", Software: Practice and Experience, vol. 12, No. 4, Apr. 1, 1982 (Apr. 1, 1982), pp. 351-366, XP055103453, ISSN: 0038-0644.

"Executable and Linkable Format (ELF)", Tool Interface Standard (TIS) Portable Formats Specificationversion 1.1, Jan. 1, 1996 (Jan. 1, 1996), pp. I-VI, 01, XP002906037.

Kil et al,: "Address Space Layout Permutation (ALSP): Towards Fine-Grained Randomization of Commodity Software", Proceedings of the 22nd Annual Comuter Security Applications Conference (ACSAC'06), 2006, pp. 339-348.

Collberg et al.: "A Taxonomy of Obfuscating Transformations, Technical Report #148", 1997, University of Auckland, Private Bag 92019, Auckland, New Zealand.

\* cited by examiner

METHOD FOR LINKING AND LOADING TO PROTECT APPLICATIONS

FIELD OF THE INVENTION

The present disclosure is directed to methods and systems for protecting software from tampering. In particular, the present disclosure is directed to methods and systems for protecting application software at linking and loading.

BACKGROUND OF THE INVENTION

Traditionally, security transformations for a given software module are applied directly to source code. For example, program transformations have been shown to be an effective approach to resistance to reverse engineering and tampering attacks to software. Additionally, the diversification of these security transformations is a further barrier to differential attacks, collusion, and other comparison threats. For example, U.S. Pat. No. 6,594,761, issued Jul. 15, 2003 and U.S. Pat. No. 6,842,862, issued Jan. 11, 2005, describe data flow transform techniques that can be used to protect software; and U.S. Pat. No. 6,779,114, issued Aug. 17, 2004, describes control flow transform techniques that can be used to protect software.

Once the security transformations have been applied, the source files are first processed by a pre-compiler, which does source-to-source security transformations of the software modules, generating transformed source-files that incorporate transformations based on user-determined security decisions. The transformed source-files are then processed by the native compiler, generating object-code. The resulting native object-code (possibly packaged as a static-library) is then immutable as far as the end-user is concerned, and must be processed by a linker to produce either an executable binary, or a dynamic-library. Libraries are integrated into a program by a linker. The output of the linker (specifically, the layout of the software modules in memory) is generated automatically, and is a deterministic function of the input software modules, optimized for runtime performance. If it is desired to modify the memory layout, most linkers require the use of complex metadata, which is generally beyond the scope of any but the most advanced of users.

If the security decisions of the software module need to be revisited, or even if the production of diverse instances of the module is desired, there is no choice but to repeat the steps of pre-compiling, compiling, and linking/loading. This is expensive, both in terms of the build-time involved, but also from a quality assurance perspective. Rebuilding the software module necessitates that the performance (speed, size, etc.) and correctness of the resulting executable/dynamic-library will have to be re-verified.

Therefore, it is desirable to provide an improved method and system for applying security transformations that obviates the need to re-build a software module, such as when security decisions need to be changed, or diverse instances need to be created.

SUMMARY OF THE INVENTION

The present disclosure provides a software linker or software loader that can modify the content of the binary output code in several ways, all of which provide security through diversity in the resulting executable/dynamic-library. Three specific embodiments are disclosed. The first involves memory image relocations. The result of the linker can be randomized base-address assignments and layouts for each segment or section of relocatable code, as opposed to the deterministic decisions made by traditional linkers. This effort can be a significant barrier to attacks based on the predictable location of sections. The second involves selective construction. Individual code modules can be made available in multiple, diverse forms, separately provisioned, in a large container library. The linker will randomly select code instances for the final executable. This effort can thwart differential attacks. The third involves late-binding of constants. Program transformations, such as data and control-flow security transforms, have operation parameters characterized through chosen constants. These parameters can be treated similarly to relocation addresses, and chosen at link-time, resulting in diversification of transformations at execution-time. This effort can also be used against differential attacks and can also enable renewability efforts through orchestrated updates.

The linker or loader accepts options to control the scope of its actions, and a random-seed parameter, which allows creation of predictably diverse output images. Thus, if the linker is invoked twice with the exact same input software modules, and the identical random-seed, the output image would be identical. To generate diverse output images, distinct random-seeds would have to be chosen.

In a first aspect, there is provided a method of applying security transformations to object-code at build-time or load-time. The method comprises specifying a random seed as input to a pseudo-random number generator. A distinct instance of an executable module, or executable program image, is then generated by applying diversification operations to a plurality of compiled software modules by applying the random seed as input to the pseudo-random number generator to make a random selection of instances of each of the plurality of compiled software modules from sets of distinct instances of each of the plurality of compiled software modules, and to determine a random layout of the selected instances of the compiled software modules. The selected instances of the compiled software modules are then combined in accordance with the random layout to generate the distinct instance of the executable module. Symbols within the distinct instance of the executable module are then resolved.

In a further aspect, there is provided a method of generating a plurality of diverse instances of an executable program image. For each desired instance of the executable program image, a random seed is specified as input to a pseudo-random number generator. A distinct instance of the executable program image is then generated by applying diversification operations to a plurality of compiled software modules by applying the random seed as input to the pseudo-random number generator to make a random selection of instances of each of the plurality of compiled software modules from sets of distinct instances of each of the plurality of compiled software modules, and to determine a random layout of the selected instances of the compiled software modules. The selected instances of the compiled software modules are then combined in accordance with the random layout to generate a distinct instance of the executable program image. Symbols within the distinct instance of the executable program image are then resolved.

The random selection can involve making a random selection from a diversely provisioned library containing a plurality of instantiated modules. Each instantiated module in the diversely provisioned library can be instantiated with distinct security characteristics, and making the random selection can further comprise embedding an asset rating for the plurality of compiled software modules and a profile weighting for call sites within the plurality of compiled software modules, and constraining the random selection based on the asset rating and the profile weighting.

Determining the random layout can comprise breaking the selected instances of the compiled software modules into separate code portions, and randomizing location of the code portions within a memory image. Randomizing the location of the code portions can comprise intermingling code portions from different ones of the selected instances of the compiled software modules, or intermingling code portions from different ones of the selected instances of the compiled software modules with data portions.

Applying the diversification operations can further comprise late binding of security transformation constants by applying the random seed as input to the pseudo-random number generator to randomly determine the security transformation constants in accordance with metadata regarding security transformations applied to the selected instances of the compiled software modules. The security transformations can be selected from program transformations, in particular data-flow transformations and control-flow transformations.

In a further aspect, there is provided a method of generating a plurality of diverse instances of an executable program image. For each desired instance of the executable program image or the dynamic library, a random seed is specified as input to a pseudo-random number generator to generate a random choice. A plurality of compiled software modules are then transformed by applying diversification operations, determined by the random choice, to the plurality of compiled software modules, and by resolving symbols associated with the plurality of compiled software modules. An instance of the executable program image having a distinct configuration determined by the resolved symbols is then generated. Transforming the plurality of compiled software modules can comprise resolving the symbols to provide a randomized memory image layout of the plurality of software modules, or resolving the symbols to provide a randomized selection of distinct instances of the plurality of software modules.

In yet another aspect, there is provided a linker or loader for providing a plurality of diverse distinct instances of executable modules encapsulated at build-time. The loader or linker comprises a pseudo-random number generator configured to cause a processor to generate a distinct random choice for each diverse distinct instance of each executable module at run-time, and a run-time module to cause the processor to transform a plurality of compiled software modules. This transformation is achieved by transforming a plurality of compiled software modules by applying diversification operations, determined by the random choice, thereto; resolving symbols associated with the plurality of compiled software modules; and generating an instance of an executable program image having a distinct configuration determined by the resolved symbols upon each invocation of the program.

In another aspect, there is provided a loader for generating a plurality of diverse instances of an executable program image. The loader comprises a pseudo-random number generator configured to cause a processor to generate a distinct random choice for each desired instance of the executable program image; and a run-time module to cause the processor to generate a distinct instance of the executable program image. The distinct instance is generated by applying diversification operations to a plurality of compiled software modules by applying the random choice to make a selection of instances of each of the plurality of compiled software modules from sets of distinct instances of each of the plurality of compiled software modules, and to determine a random layout of the selected instances of the compiled software modules; combining the selected instances of the compiled software modules in accordance with the random layout to generate a distinct instance of the executable program image; and resolving symbols within the distinct instance of the executable program image. The random layout can include, for example, random address assignment at run-time loading. The selection of instances of each of the plurality of compiled software modules can be based on run-time conditions, such as detecting an unauthorized breach.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
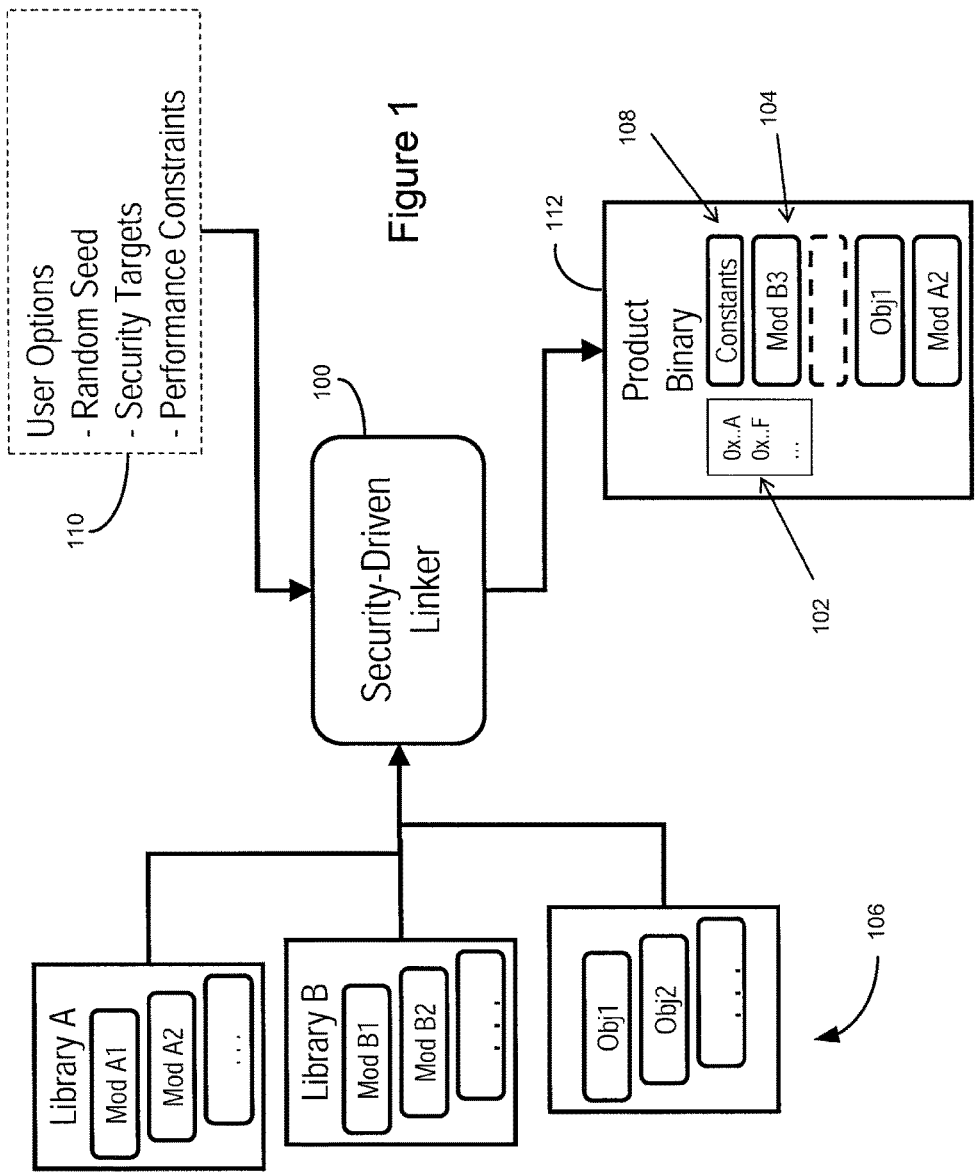
FIG. 1 shows build-time linking of a product binary with protection through diversity.

This disclosure describes a method whereby the security transformations of a software module can be deferred until link or load-time, providing several benefits over conventional source-to-source security transformations. These deferred security transformations can be applied in a very light-weight manner and create many opportunities for diversity in the resulting executable program, enhancing security, while at the same time minimizing the impact on execution performance and correctness, and reducing the complexity of debugging.

Software linkers and linker technology have existed for many years and provide the ability to combine a collection of previously compiled software modules into a single executable binary or dynamic-library. The primary job of the linker is to combine compiled software modules into a single memory image, deciding where each module should reside in memory, and "fixing up" or relocating any inter-module address references (such as subroutine calls) so that they are correct, given the memory layout chosen. (see e.g. J. Levine, *Linkers and Loaders* Morgan Kaufmann Publishers, 2000) Over the years the main innovations for linker technology have been limited to improving performance, providing the ability to target different processors and operating systems, and support for advanced programming languages.

Traditional software linkers largely treat the native-object code as immutable, limiting modification to the absolute minimum necessary to combine the input software modules (in object-code form) into a single executable-binary or dynamic-library. A linker or link editor is a program that takes one or more objects generated by a compiler and combines them into a single executable program. Computer programs typically comprise several parts or modules; all these parts/modules need not be contained within a single object file, and in such case refer to each other by means of symbols. Typically, an object file can contain three kinds of symbols: defined symbols, which allow it to be called by other modules; undefined symbols, which call the other modules where these symbols are defined; and local symbols, used internally within the object file to facilitate relocation. When a program comprises multiple object files, the linker combines these files into a unified executable program, resolving the symbols as it goes along.

Linkers can take objects from a collection of objects or subroutines, termed a library. Some linkers do not include the whole library in the output; they only include its symbols that are referenced from other object files or libraries. The linker also takes care of arranging the objects in a program's address space. This may involve relocating code that assumes a specific base address to another base. Since a compiler seldom knows where an object will reside, it often assumes a fixed base location (for example, zero). Relocating machine code may involve, for example, re-targeting of absolute jumps, loads and stores. The executable output by the linker may need another relocation pass when it is finally loaded into memory, just prior to execution.

Dynamic linking involves loading the subroutines of a library into an application program at runtime, rather than linking them in at compile time; the subroutines remain as separate files on disk. Only a minimum amount of work is done at compile time by the linker; it only records the library routines the program needs and the index names or numbers of the routines in the library. The majority of the work of linking is done at the time the application is loaded (load-time) or during execution (run-time). The necessary linking functionality, termed a loader, is actually part of the underlying operating system. At the appropriate time the loader finds the relevant libraries on disk and adds the relevant data from the libraries to the process's memory space.

As the linker is typically the last step in a build process, there is an opportunity to go beyond the traditional jobs of symbol resolution, layout determination, and address binding. The link-step can be used as a means to combine a plurality of diverse implementations, resisting a set of class attacks, and provides the basis for revisiting traditional linker techniques. Introducing diversity at link-time has the benefits of being light-weight. There is no need to re-run expensive compilation steps, making it practical to generate huge numbers of diverse instances correctly. Each instance will have predictable performance. Since the code is largely fixed (already compiled), this kind of diversity is unlikely to introduce large variation in execution performance. This will also lead to a reduced testing effort, since the code of one diverse instance is representative of the behaviour of all other diverse instances: thorough testing of one diverse instance can be assumed to represent the behaviour of all other diverse instances.

The present disclosure provides a software linker or loader, and associated linking and loading methods, that can generate the content of the binary output code in several ways, all of which provide security through diversity in the resulting executable/dynamic-library. Three specific diversification operations that can be applied to the object-code are described. The diversification operations can be applied separately, or combined, in any suitable manner depending on design requirements. The extended linker tooling accepts options to control the scope of its actions, and a seed as input to a pseudo-random number generator (PRNG), which allows creation of predictably diverse output images. Thus, if the linker is invoked twice with the exact same input software modules, and the identical seed, the output image would be identical. To generate diverse output images, distinct seeds are chosen.

FIG. 1 shows a security driven linker 100 that is enabled to perform the three diversification operations discussed in greater detail below: memory relocations 102, selective construction 104 based on diversely instantiated libraries and object modules 106, and late-binding of transformation constants 108, all determined in accordance with inputs 110, such as a seed to a PRNG, and optional security targets and performance constraints. The result of the diversification operations is a security-enhanced instance 112 of a product binary, or output image, that is resistant to tampering, or a number of different instances 112 of an output image determined by changing the inputs 110. Depending on context, the output image 112 is described as an executable program image, a memory image, an executable module, or a dynamic library.

Memory Image Relocations

A traditional linker will predictably locate its input software modules in the output memory image, based on their ordering on the command-line, and on their interdependencies (which modules references which other modules). Moreover, it will typically ensure that similar kinds of memory segments are grouped together, e.g., putting all constant string-data in one memory segment. This is done for convenience (simpler relocation algorithms), ease of debugging, and to maximize runtime performance of the resulting executable image due to cache locality.

Referring to FIG. 1, a first disclosed diversification operation involves memory image relocations 102. The result of the linker can be randomized base-address assignments, 0x . . . A, 0x . . . F, etc. and randomized layouts for each segment or section of relocatable code, as opposed to the deterministic decisions made by traditional linkers. This effort can be a significant barrier to attacks based on the predictable location of sections. The linker 100 can, upon request and based on inputs 110, such as the seed for the PRNG, ensure that each output image 112 has a completely new memory image layout (i.e. the location of each segment or section of relocatable code is randomly determined by the random seed parameter), and can moreover inter-mix, or intermingle, memory segments of different types, i.e. data and code, throughout the memory image. This extends the traditional relocation functions of a linker, which can only relocate the code for individual functions within a software module in a deterministic manner, by providing the linker 100 with the capability to freely intermingle code and data. Intermingling data and code serves as an impediment to the correct operation of binary image disassemblers/analyzers such as IDA Pro™.

Ideally, correct functional behaviour of the executable output image 112 should be identical for all diverse instances of the memory layouts. Raw execution performance will be affected by cache locality issues, though with suitable choice of memory layout algorithms, performance variation can be kept to a minimum. As a result, both performance and correctness will be maintained across all diverse instances created by the extended linker when using memory image relocations.

Selective Construction

With a traditional linker, each externally visible entity (such as functions or global variables) must be provided exactly once in the set of input software modules. Otherwise, the entity is considered to be "multiply defined", and an error will be issued. In the present linker 100, a second diversification operation involves "mix and match" linking, or selective construction 104 based on diversely instantiated object modules within each library 106.

Libraries 106 can be created with a plurality of implementation modules. For example, multiple versions, or instances (Mod A1, Mod A2, . . . ; Mod B1, Mod B2 . . . ; Obj1, Obj2, . . . ), of a program module can be created. Each instance of a given program module performs the same functional behavior. The multiple, diverse instances (Mod A1, Mod A2, . . . ; Mod B1, Mod B2 . . . ; Obj1, Obj2, . . . ) can be separately provisioned, in a large container library. Since all instances provide the same functionality, the present linker 100 can randomly select specific instances for the final executable. This effort can thwart differential attacks, which attempt to gain information through comparisons. The linker 100 can support a mode in which one of a set of multiple, diverse instances of a given externally visible entity (typically a function) will be selected, again based on the random choice determined by the seed. If many functions are available in many diverse instances (each with their own set of security transforms), the number of possible, diverse output images is the product of the number of such functions and instances. This gives tremendous scope for creating large numbers of diverse instances, and moreover, since each instance can involve considerably different implementations of individual functions, the ability to apply knowledge gained from reverse-engineering one instance to any other instance is minimized.

The multiple instances can not only have diverse implementations to thwart differential analysis; but can also be created to have different performance and/or security characteristics (see inputs 110). For example, for a function that performs a cryptographic hash, the linker 100 can choose to use a highly protected, yet slower implementation in a non-time critical area or process. In a time critical area or process, the linker can choose to trade-off the security aspects with a high-performance implementation. Given the right input of security and performance goals, as determined by design considerations, combined with the proper characterization of implementations and algorithm analysis information, the linker 100 has the opportunity to balance the constraints by mixing and matching the functional implementations.

Figure 2:
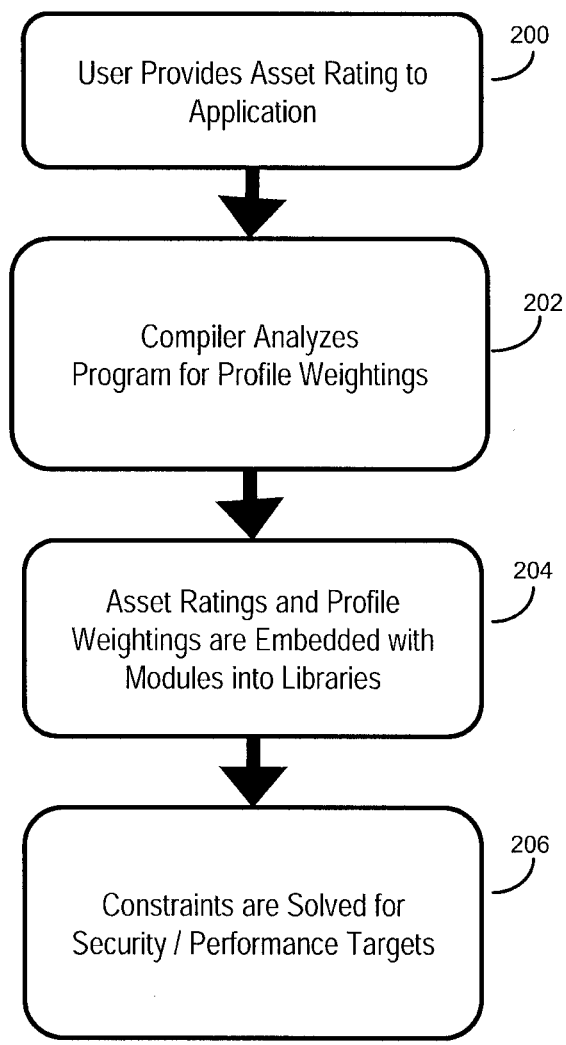
FIG. 2 is a flowchart for optimizing mix-match selection for security/performance targets.

FIG. 2 depicts an optimization method for balancing security versus performance, which proceeds as follows. At step 200, the user provides information regarding high value assets in the application. This includes adding a rating of critical assets versus less critical assets (i.e. an asset rating). Examples of these critical assets can include: the cryptographic keys in the system, node-locking computations, and rights management logic. At step 202, weightings are assigned to call-sites based upon profiling. Either dynamic or static source level profiling is produced for the application at the function and basic-block level. Dynamic profiling is likely preferred, but in its absence static profiling can be produced by a source-level analyzer (e.g. compiler or precompiler) by propagating estimates on loop frequencies through a call-graph. For each function call-site found in the application, a profile weighting may be associated. At step 204, the asset ratings and profile weightings are embedded with the appropriate object and library modules. For example, the information produced contained in the asset ratings and profile weightings are carried through the compilation and library creation stages, so that they can be embedded as extra information associated with the modules in the library. At step 206, the linker 100 uses the embedded information to select modules, optimizing for the security/performance target using a constraint-based solution algorithm. There are many known approaches to constraint-solving.

Late-Binding of Transformation Constants

Traditional software linkers identify locations in the input native-object code that must be "fixed up" (or relocated) based on the final memory-image layout decisions taken by the linker. These are typically references to externally visible symbols (such as global variables or functions) found in other software modules. Such relocations are typically the only part of the native-object code which is actually modified by the linking process. Security transformations on code and data often involve the use of characteristic constants. For example, data transformations involve the use of mathematical mapping functions which transform both data operations and locations to alternate mathematical spaces are described in U.S. Pat. No. 6,594,761, issued Jul. 15, 2003 and U.S. Pat. No. 6,842,862, issued Jan. 11, 2005, the contents of which are incorporated herein by reference in their entirety. In order to do this, the mapping tool (i.e. the "transcoder") uses a set of function families and a number of characteristic constants for each mapping. Similarly, control-flow transformations (as described in U.S. Pat. No. 6,779,114, issued Aug. 17, 2004, and is incorporated herein by reference in its entirety) map the control-flow of a given program into a new control-flow form, using a number of functions to control the flow. These functions also carry with them a set of chosen constants.

In each of these cases, the constants are chosen randomly (and consistently among each other). The set of constants become a distinguishing factor for the program instance and are necessary for the program to function correctly. The precise values of these constants are chosen by the mapping tool (i.e. the transcoder), based on the characteristics of the transformation functions. Moreover, there may be many inter-related security transform constants found throughout the application that have been selected in a mutually consistent manner, so that changing one constant might require changing many of the others in some consistent way.

As a further diversification operation that can be applied to the object-code, late-binding of constants used in program transformations, in particular data and control-flow transforms, can also be performed. In this case, the set of constants is replaced by a second set of constants (chosen randomly), which must work consistently together, but nevertheless, represent a second distinguishing factor for the program instance. These constants can be treated similarly to relocation addresses, and chosen at link-time, resulting in diversification of transformations at execution-time. Such a modification further protects against differential attacks, and can also enable renewability efforts through orchestrated updates.

Figure 3:
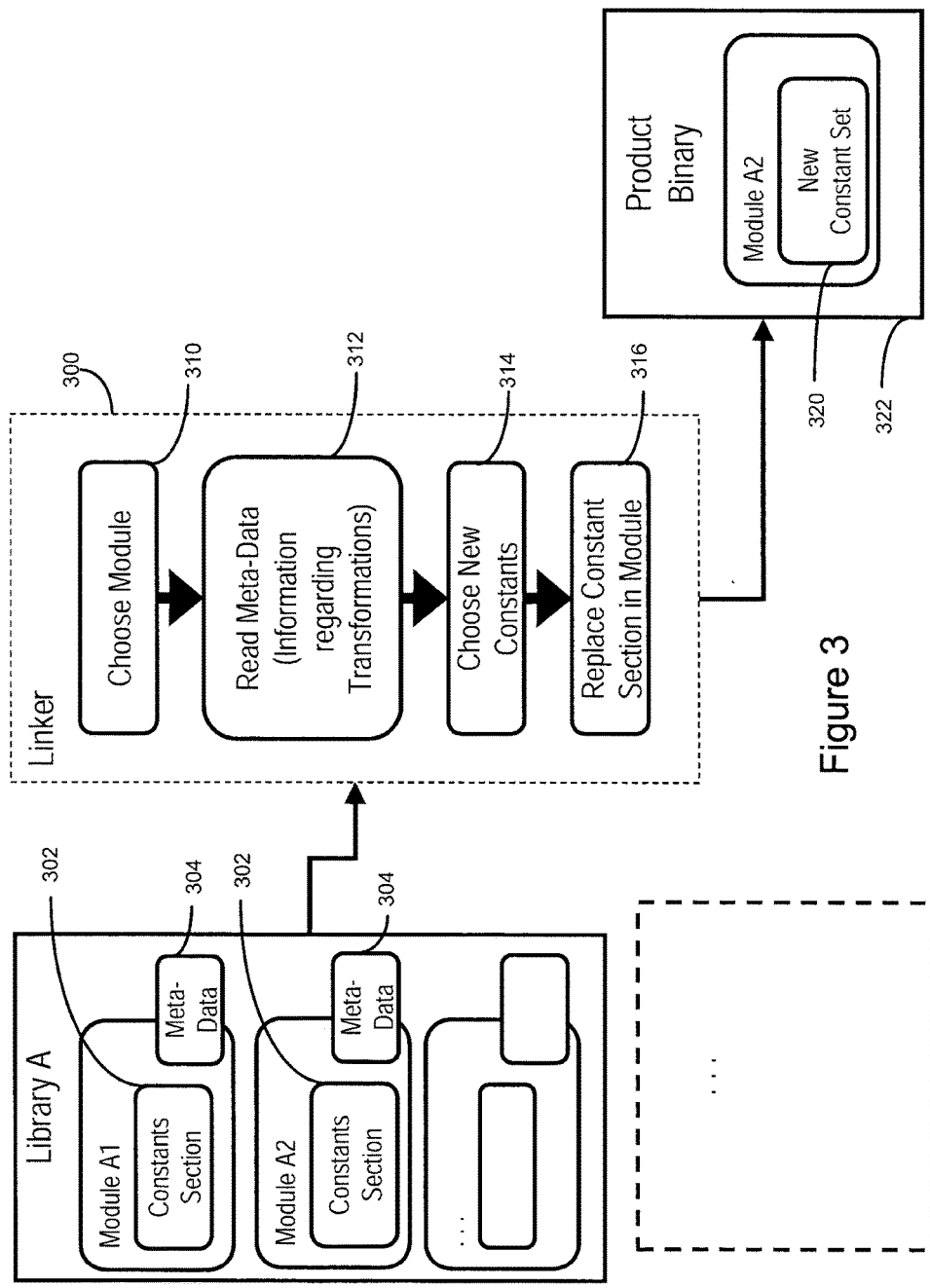
FIG. 3 shows late-binding of transformation constants.

The linker can, by analogy with a traditional linker's relocation ability, modify the characteristic constant sets for the program transformations, such as data and control-flow transformations. These sets are generated by a PRNG (Pseudo-Random Number Generator) which is initialized by a seed. The possible values for the constants in each set are very large, resulting in a tremendous range for diversity in the resulting executable or dynamic-library. Referring to FIG. 3, a method for selecting constants at link-time is shown. The linker 300 is in communication with Library A, provisioning a plurality of software modules (Module A1, Module A2, . . . ). Each software module includes a constant section 302 and metadata 304 regarding the characteristics of the security transformations. The linker 300 first selects a module (step 310), and then reads the metadata 304 associated with the selected module (step 312). Based on the metadata, the linker 300 chooses new constants (step 314), and replaces the constant section with the new set of constants 320 in the product binary 322 (step 316).

Since each set of constants does not affect the correct behaviour of the application (assuming that the set satisfies the mathematical constraints given in the metadata), the verification of performance/correctness for such diverse instances is straightforward. One consistent set of constants is expected to behave the same as a second consistent set of constants. This form of link-time diversity thus represents a good trade-off between minimal overhead to the user and maximum security against differential attacks. It is also ideally suited for providing renewability in fielded applications, where the application binary is periodically updated with new sets of characteristic constants, meaning that any attacker does not have the luxury of a fixed binary image to analyze.

Run-Time Loading

Figure 4:
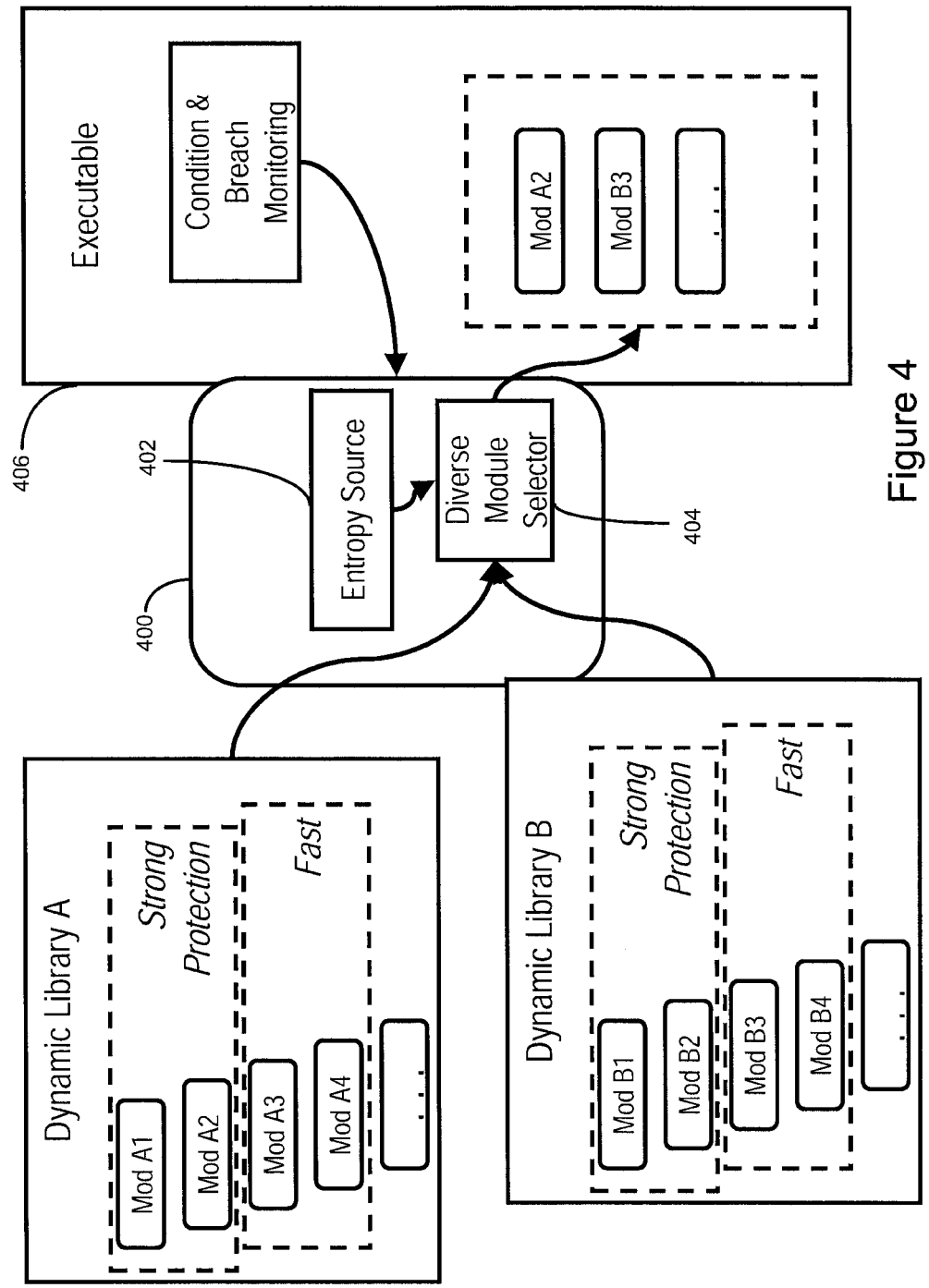
FIG. 4 shows selecting diverse modules at run-time loading.
Figure 5:
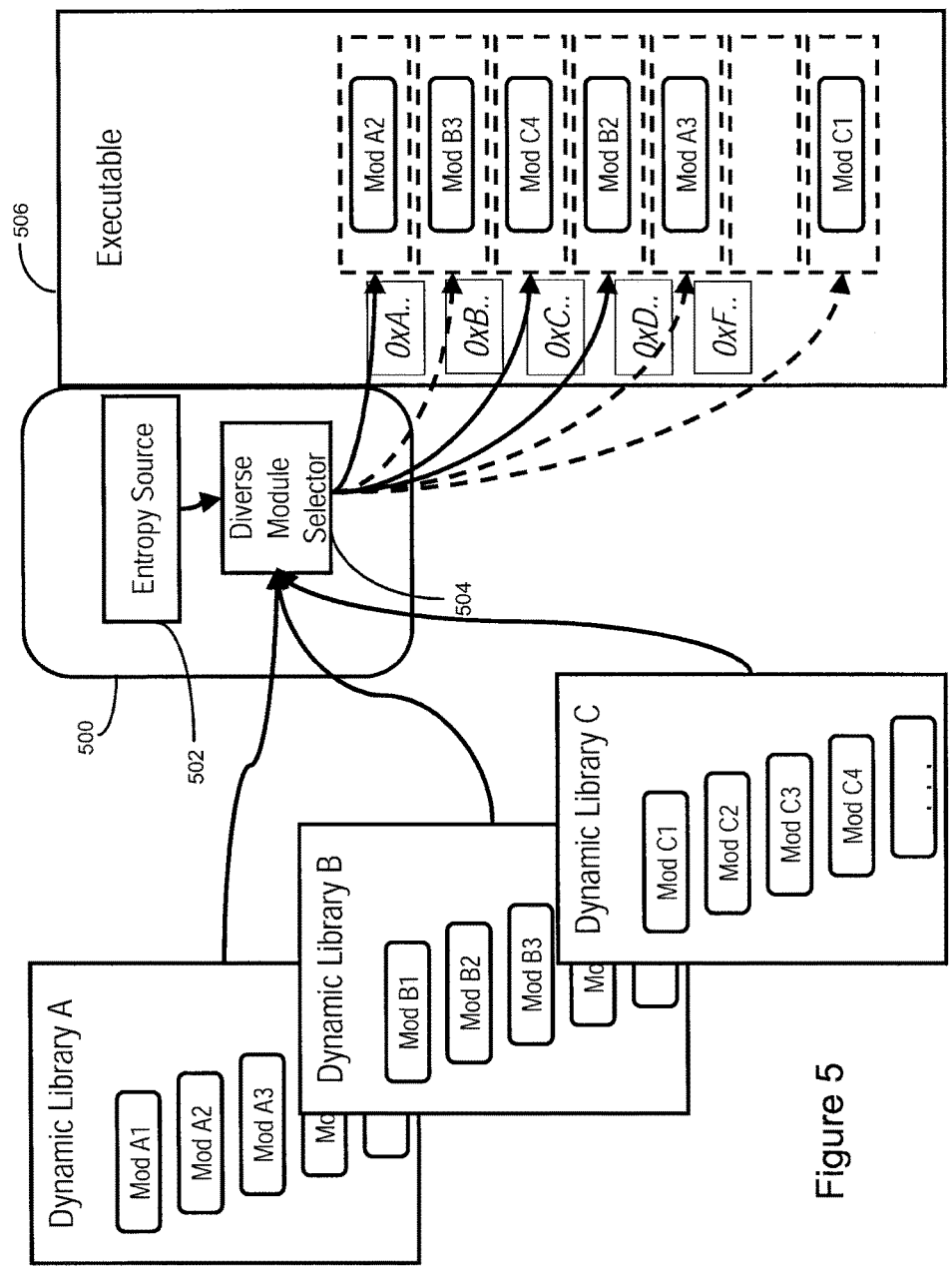
FIG. 5 shows random address assignment at run-time loading.

A loader can also be thought of as a linker that is invoked at run-time. All of the above techniques which describe build-time, or load-time, linking features can also be considered to be invoked at run-time. The advantage of performing such features at run-time is the ability to insert other secure protection techniques, as well as to react to conditions in the field. A loader is shown in FIGS. 4 and 5. FIG. 4 shows the selection from diverse instances of modules to load into the product binary, while FIG. 5 shows random address assignment at run-time loading.

In the embodiment of FIG. 4, the multiple, diverse instances of software modules (Mod A1, Mod A2, Mod A3, Mod A4 . . . ; Mod B1, Mod B2, Mod B3, Mod B4 . . . ) can be separately provisioned in dynamic libraries, such as Dynamic Library A and Dynamic Library B. The instances can be further characterized by separate implementation factors or criteria. For example, certain instances can be characterized as having a high security level, such as the "Strong Protection" of modules Mod A1 and Mod A2, or they can be characterized by their speed of execution, such as the "Fast" modules Mod A3, Mod A4.

To provide diversity at run-time, the loader 400 requires a run-time source of entropy 402 and a pseudo-random number generator (PRNG), which controls a diverse module selector 404 to make pseudo-random decisions, and ensures that the behaviour, or output executable 406 of the run-time loader is different each time it is invoked. The run-time loader 400 can choose from the variety of implementations found in the dynamic libraries, based on run-time conditions. For example, if a breach management module discovered that an attack was happening (e.g. the process is being emulated and debugged), it could signal to the loader to load an implementation with the highest security levels and protection capabilities present (i.e. a randomized selection from the modules Mod A1 and Mod A2, or Mod B1 and Mod B2. Based on other conditions, it may make other decisions. For example, if the application is repeatedly invoked, while never reaching its critical execution points, the loader may choose to load random implementations to a finer grain than usual. This would impede differential attacks and discourage an adversary who is relying on repeatability and predictability.

In the embodiment shown in FIG. 5, multiple, diverse instances of software modules (Mod A1, Mod A2, Mod A3, Mod A4 . . . ; Mod B1, Mod B2, Mod B3, Mod B4 . . . ; and Mod C1, Mod C2, Mod C3, Mod C4 . . . ) can again be separately provisioned in dynamic libraries, such as Dynamic Library A, Dynamic Library B and Dynamic Library C, and the run-time loader 500 again includes a run-time source of entropy 502 and a pseudo-random number generator (PRNG), which controls a diverse module selector 504 to make pseudo-random decisions. In this embodiment, the diverse selector module 504 can be implemented to function as described above in relation to memory image relocations and selective construction. Specific diverse instances of the modules can be selected, and each selected module can be assigned a random address as it is loaded at run-time. The executable 506 could be composed in such a manner that the majority of its functionality is made up of dynamic library modules. As modules are loaded at varying times of execution, in addition to the modules being selected from a diverse set of choices, the modules are also loaded at random addresses in memory. This presents a significant obstacle for an attacker running a debugging or emulation session. As the program is executing, not only is there an unpredictably diverse module being loaded, but the location of the module is also unpredictable and non-repeatable.

Construction of a Dynamic Library

A dynamic library (e.g. .dll on Windows, .so on Linux, .dylib on Mac) is typically created by a native linker and can be closely compared to a directly executable image. Traditionally, a large majority of the symbols in the dynamic entity have already been resolved by the time the library is created. It is ready for execution by the time it has been created. On the other hand, the dynamic library does need to be loaded into an executing program before it is run. It is at this point that the loader has an opportunity to relocate some symbols before the execution of the library. All unresolved symbols in the dynamic library are resolved just before execution. Because the library is created by the linker, it cannot contain ambiguously defined symbols. It is essentially ready for execution, apart from a small number of relocatable symbols.

Figure 6:
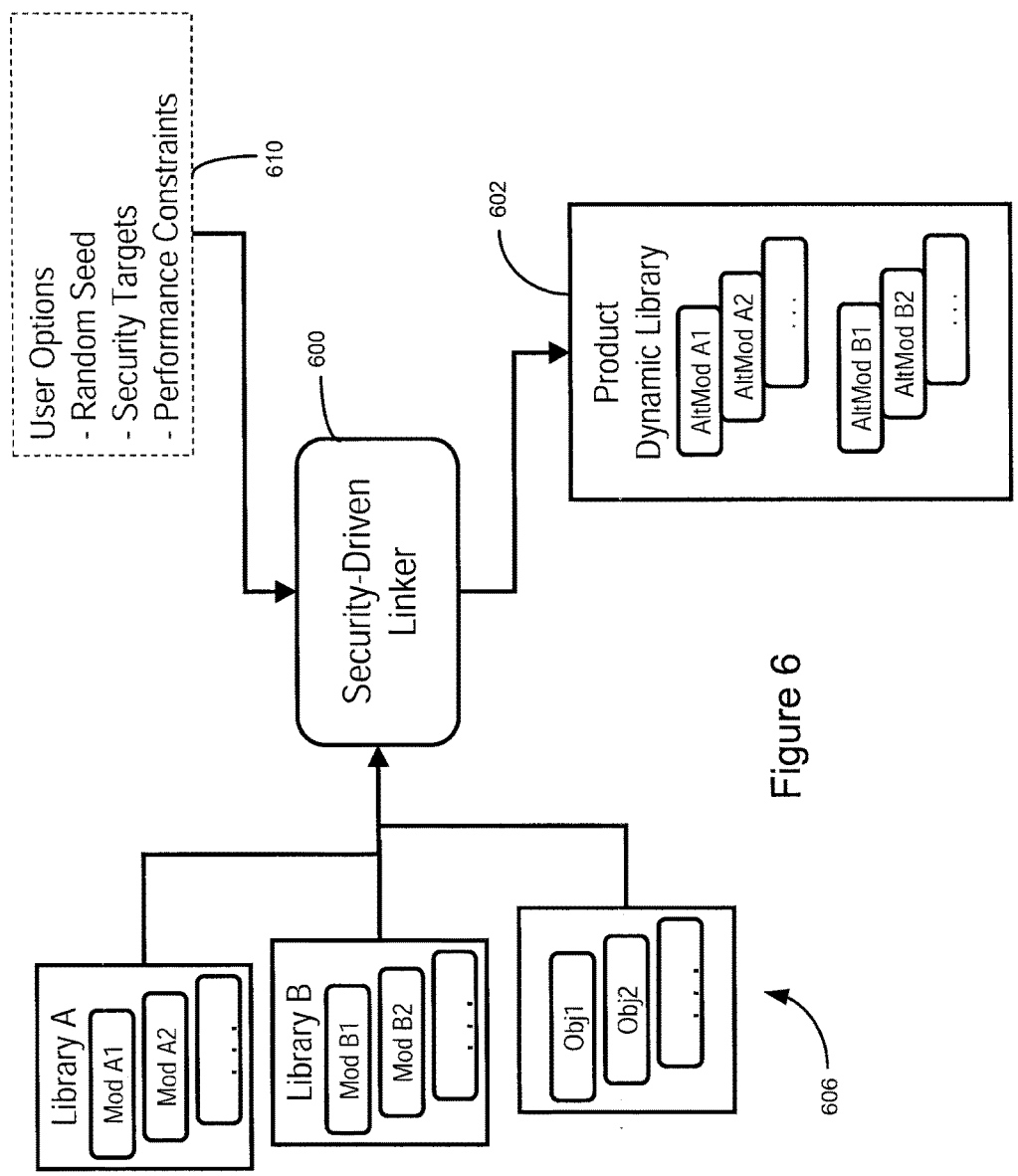
FIG. 6 shows construction of a dynamic library with alternative, diverse modules.

However, diversity can also be introduced in the construction of a product dynamic library, as shown in FIG. 6. A dynamic library creation mechanism provides multiple alternative modules (i.e. functions and data): AltMod A1, AltMod A2, . . . ; AltMod B1, AltMod B2, . . . . Each alternative module presents an optional equivalent to the original instances of the respective modules (Mod A1, Mod A2, . . . ; Mod B1, Mod B2 . . . ; Obj1, Obj2, . . . ). The creation of the library requires a linker 600 which encapsulates alternative modules in the product dynamic library 602. It also carries a table pointing to the alternative modules. Subsequently, at run-time an appropriately implemented loader can make a random choice among alternative, diverse modules by querying the table, as detailed above.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A method executed by one or more computing devices for generating an instance of an executable program, the method comprising:
    receiving, by at least one of the one or more computing devices, a random seed as input to a pseudo-random number generator;
    generating, by at least one of the one or more computing devices, a distinct instance of an executable program, wherein the executable program is generated from a plurality of instances of object code modules by:
        selecting each object code module in a plurality of object code modules from a plurality of distinct instances of that object code module by applying the random seed as input to the pseudo-random number generator;
        determining a random layout of the plurality of object code modules by applying the random seed as input to the pseudo-random number generator; and
        combining the plurality of object code modules in accordance with the random layout to generate the distinct instance of the executable program; and
    resolving, by at least one of the one or more computing devices, symbols within the distinct instance of the executable program.

2. The method of claim 1, wherein the plurality of distinct instances of each object code module comprise a diversely provisioned library containing a plurality of instantiated object code modules.

3. The method of claim 2, wherein each instantiated object code module in the diversely provisioned library is instantiated with distinct security characteristics, and wherein selecting further comprises:
    embedding an asset rating for the plurality of object code modules and a profile weighting for call sites within the plurality of object code modules; and
    constraining the selection based on the asset rating and the profile weighting.

4. The method of claim 1, wherein determining the random layout comprises breaking each of the plurality of object code modules into separate code portions, and randomizing location of the code portions within a memory image.

5. The method of claim 4, wherein randomizing the location of the code portions comprises intermingling code portions from different object code modules in the plurality of object code modules.

6. The method of claim 4, wherein randomizing the location of the portions comprises intermingling code portions from different object code modules in the plurality of object code modules with data portions.

7. The method of claim 1, wherein generating a distinct instance of an executable program further comprises late binding of security transformation constants by:
    determining the security transformation constants for each object code module in the plurality of object code modules based on metadata regarding security transformations applied to that instance of the object code module.

8. The method of claim 7, wherein the security transformations comprise program transformations.

9. The method of claim 8, wherein the program transformations comprise data-flow transformations or control-flow transformations.

10. The method of claim 1, wherein the distinct instance of the executable program is generated at one of: build-time, load-time, and run-time.

11. The method of claim 1, wherein the distinct instance of the executable program is generated at run-time and the random layout includes random address assignment at run-time loading.

12. The method of claim 11, wherein the selection of each object code module in the plurality of object code modules from a plurality of distinct instances of that object code module is further based at least in part on run-time conditions.

13. The method of claim 12, wherein the run-time conditions include detecting an unauthorized breach.

14. A method executed by one or more computing devices for generating a plurality of diverse instances of an executable program, the method comprising:
    for each instance of the executable program in the plurality of diverse instances of the executable program:
        receiving, by at least one of the one or more computing devices, a random seed as input to a pseudo-random number generator;
        generating, by at least one of the one or more computing devices, a distinct instance of an executable program, wherein the executable program is generated from a plurality of instances of object code modules by:
            selecting each object code module in a plurality of object code modules from a plurality of distinct instances of that object code module by applying the random seed as input to the pseudo-random number generator;
            determining a random layout of the plurality of object code modules by applying the random seed as input to the pseudo-random number generator; and
            combining the plurality of object code modules in accordance with the random layout to generate the distinct instance of the executable program; and
        resolving, by at least one of the one or more computing devices, symbols within the distinct instance of the executable program.

15. An apparatus for generating an instance of an executable program, the apparatus comprising:
one or more processors; and
one or more memories operatively coupled to at least one of the one or more processors and having instructions stored thereon that, when executed by at least one of the one or more processors, cause at least one of the one or more processors to:
receive a random seed as input to a pseudo-random number generator;
generate a distinct instance of an executable program, wherein the executable program is generated from a plurality of instances of object code modules by:
selecting each object code module in a plurality of object code modules from a plurality of distinct instances of that object code module by applying the random seed as input to the pseudo-random number generator;
determining a random layout of the plurality of object code modules by applying the random seed as input to the pseudo-random number generator; and
combining the plurality of object code modules in accordance with the random layout to generate the distinct instance of the executable program; and
resolve symbols within the distinct instance of the executable program.

16. The apparatus of claim 15, wherein the plurality of distinct instances of each object code module comprise a diversely provisioned library containing a plurality of instantiated object code modules.

17. The apparatus of claim 16, wherein each instantiated object code module in the diversely provisioned library is instantiated with distinct security characteristics and wherein the instructions that, when executed by at least one of the one or more processors, cause at least one of the one or more processors to select each object code module further cause at least one of the one or more processors to:
embed an asset rating for the plurality of object code modules and a profile weighting for call sites within the plurality of object code modules; and
constrain the selection based on the asset rating and the profile weighting.

18. The apparatus of claim 15, wherein determining the random layout comprises breaking each of the plurality of object code modules into separate code portions, and randomizing location of the code portions within a memory image.

19. The apparatus of claim 15, wherein the distinct instance of the executable program is generated at one of: build-time, load-time, and run-time.

20. An apparatus for generating a plurality of diverse instances of an executable program, the apparatus comprising:
one or more processors; and
one or more memories operatively coupled to at least one of the one or more processors and having instructions stored thereon that, when executed by at least one of the one or more processors, cause at least one of the one or more processors to:
for each instance of the executable program in the plurality of diverse instances of the executable program:
receive a random seed as input to a pseudo-random number generator;
generate a distinct instance of an executable program, wherein the executable program is generated from a plurality of instances of object code modules by:
selecting each object code module in a plurality of object code modules from a plurality of distinct instances of that object code module by applying the random seed as input to the pseudo-random number generator;
determining a random layout of the plurality of object code modules by applying the random seed as input to the pseudo-random number generator; and
combining the plurality of object code modules in accordance with the random layout to generate the distinct instance of the executable program; and
resolve symbols within the distinct instance of the executable program.

21. At least one non-transitory computer-readable medium storing computer-readable instructions that, when executed by one or more computing devices, cause at least one of the one or more computing devices to:
receive a random seed as input to a pseudo-random number generator;
generate a distinct instance of an executable program, wherein the executable program is generated from a plurality of instances of object code modules by:
selecting each object code module in a plurality of object code modules from a plurality of distinct instances of that object code module by applying the random seed as input to the pseudo-random number generator;
determining a random layout of the plurality of object code modules by applying the random seed as input to the pseudo-random number generator; and
combining the plurality of object code modules in accordance with the random layout to generate the distinct instance of the executable program; and
resolve symbols within the distinct instance of the executable program.

22. The at least one non-transitory computer-readable medium of claim 21, wherein the plurality of distinct instances of each object code module comprise a diversely provisioned library containing a plurality of instantiated object code modules.

23. The at least one non-transitory computer-readable medium of claim 22, wherein each instantiated object code module in the diversely provisioned library is instantiated with distinct security characteristics and wherein the instructions that, when executed by at least one of the one or more computing devices, cause at least one of the one or more computing devices to select each object code module further cause at least one of the one or more computing devices to:
embed an asset rating for the plurality of object code modules and a profile weighting for call sites within the plurality of object code modules; and
constrain the selection based on the asset rating and the profile weighting.

24. The at least one non-transitory computer-readable medium of claim 21, wherein determining the random layout comprises breaking each of the plurality of object code modules into separate code portions, and randomizing location of the code portions within a memory image.

25. The at least one non-transitory computer-readable medium of claim 21, wherein the distinct instance of the executable program is generated at one of: build-time, load-time, and run-time.

26. At least one non-transitory computer-readable medium storing computer-readable instructions that, when executed by one or more computing devices, cause at least one of the one or more computing devices to:
- for each instance of an executable program in a plurality of diverse instances of the executable program:
  - receive a random seed as input to a pseudo-random number generator;
  - generate a distinct instance of an executable program, wherein the executable program is generated from a plurality of instances of object code modules by:
    - selecting each object code module in a plurality of object code modules from a plurality of distinct instances of that object code module by applying the random seed as input to the pseudo-random number generator;
    - determining a random layout of the plurality of object code modules by applying the random seed as input to the pseudo-random number generator; and
    - combining the plurality of object code modules in accordance with the random layout to generate the distinct instance of the executable program; and
- resolve symbols within the distinct instance of the executable program.

* * * * *